United States Patent
Mitsumoto et al.

(10) Patent No.: US 10,737,688 B2
(45) Date of Patent: Aug. 11, 2020

(54) BEHAVIOR CONTROL APPARATUS FOR VEHICLE

(71) Applicant: TOYOTA JIDOSHA KABUSHIKI KAISHA, Toyota-shi, Aichi-ken (JP)

(72) Inventors: Hisanori Mitsumoto, Hadano (JP); Takemi Murayama, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 85 days.

(21) Appl. No.: 16/192,198

(22) Filed: Nov. 15, 2018

(65) Prior Publication Data
US 2019/0152471 A1  May 23, 2019

(30) Foreign Application Priority Data
Nov. 17, 2017  (JP) .................. 2017-222184

(51) Int. Cl.
| | | |
|---|---|---|
| *B60W 30/02* | (2012.01) | |
| *B60W 10/18* | (2012.01) | |
| *B60W 30/12* | (2020.01) | |
| *B60W 10/184* | (2012.01) | |

(52) U.S. Cl.
CPC .......... *B60W 30/02* (2013.01); *B60W 10/184* (2013.01); *B60W 30/12* (2013.01); *B60W 2520/10* (2013.01); *B60W 2520/14* (2013.01); *B60W 2540/18* (2013.01); *B60W 2710/18* (2013.01)

(58) Field of Classification Search
CPC .... B60W 30/02; B60W 30/12; B60W 10/184; B60W 2520/14; B60W 2540/18; B60W 2520/10; B60W 2710/18; B60W 40/114; B60W 2720/406; B60W 2520/28; B60W 10/18; B60W 40/10; B60W 40/109; B60W 40/105; B60T 8/17557; B60T 8/1755; B60T 8/17; B60T 8/246; B60T 2201/083
See application file for complete search history.

(56) References Cited

U.S. PATENT DOCUMENTS

| | | | | |
|---|---|---|---|---|
| 2012/0046805 | A1* | 2/2012 | Nishigaki | ........... B60T 8/17551 701/1 |
| 2014/0324311 | A1* | 10/2014 | Hagenlocher | ......... B60T 8/1755 701/70 |
| 2015/0006034 | A1* | 1/2015 | Kozuka | ............... B60T 8/17551 701/41 |

FOREIGN PATENT DOCUMENTS

| | | |
|---|---|---|
| JP | 09-086378 A | 3/1997 |
| JP | 2004-026074 A | 1/2004 |

(Continued)

*Primary Examiner* — Rodney A Butler
(74) *Attorney, Agent, or Firm* — Sughrue Mion, PLLC

(57) ABSTRACT

A behavior control apparatus is provided which is configured to calculate a first normative yaw rate of the vehicle based on a vehicle speed, a steering angle and a lateral acceleration of the vehicle, to calculate a second normative yaw rate of the vehicle based on a vehicle speed and a steering angle, to determine, when deflection control is not being performed, that vehicle behavior is unstable when an absolute value of a first yaw rate deviation between the first normative yaw rate and an actual yaw rate of the vehicle is larger than a first reference value, and to determine, when the deflection control is being performed, that vehicle behavior is unstable when an absolute value of a second yaw rate deviation between the second normative yaw rate and an actual yaw rate of the vehicle is larger than a second reference value.

7 Claims, 8 Drawing Sheets

(56) References Cited

FOREIGN PATENT DOCUMENTS

JP 2009132204 A * 6/2009
JP 2015123835 A * 7/2015

* cited by examiner

BEHAVIOR CONTROL APPARATUS FOR VEHICLE

CROSS-REFERENCE TO RELATED APPLICATION

The disclosure of Japanese Patent Application No. JP2017-222184 filed on Nov. 17, 2017 is incorporated by reference in its entirety.

BACKGROUND

1. Technical Field

The present disclosure relates to a behavior control apparatus for a vehicle such as an automobile.

2. Description of the Related Art

A behavior control apparatus that performs, in a vehicle such as an automobile, behavior control for stabilizing turning behavior of the vehicle by controlling braking/driving forces of wheels when running stability of the vehicle decreases, is well known in the art. For example, Japanese Patent Application Laid-open Publication No. H09-86378 discloses a behavior control apparatus configured to perform a behavior control by controlling driving forces and braking forces of left and right wheels based on a deviation between a normative yaw rate of the vehicle and an actual yaw rate so as to reduce the yaw rate deviation to stabilize the behavior of a vehicle. In the disclosed behavior control apparatus, a normative yaw rate of the vehicle is calculated based on a vehicle speed and a steering angle (hereinafter referred to as "a normative yaw rate calculated without using a vehicle lateral acceleration").

SUMMARY

It is also well known in the art to calculate a normative yaw rate of a vehicle based on a vehicle speed, a steering angle and a lateral acceleration of the vehicle as described in, for example, Japanese Patent Application Laid-open Publication No. 2004-26074 (hereinafter referred to as "a normative yaw rate calculated using a vehicle lateral acceleration"). Therefore, in the behavior control as described in the above former publication, it is conceivable to calculate a yaw rate deviation by using a normative yaw rate calculated by using a vehicle lateral acceleration instead of a normative yaw rate calculated without using a vehicle lateral acceleration. It is also conceivable to perform a behavior control using both a deviation between a normative yaw rate calculated without using a vehicle lateral acceleration and an actual yaw rate and a deviation between a normative yaw rate calculated using a vehicle lateral acceleration and an actual yaw rate.

Meanwhile, as one of driving support controls performed by controlling braking forces of wheels, a deflection control such as lane departure prevention control is known in the art. In a deflection control, a yaw moment is given to a vehicle by applying a braking force to one of the left and right wheels without considering a yaw rate of the vehicle, whereby the vehicle is deflected in a required direction. Therefore, when a deflection control is performed, a yaw rate change corresponding to the yaw moment is generated in the vehicle, which changes an actual yaw rate. Further, when a deflection control is performed, even if behavior of a vehicle is stable, a magnitude of a deviation between a normative yaw rate calculated without using a vehicle lateral acceleration and an actual yaw rate may become large, so that it may erroneously be determined that behavior of the vehicle has become unstable.

In addition, when a vehicle travels on a bank road or a canted road that is inclined in the left-right direction, a lateral force in the inclination direction of the road surface due to the gravity acts on the vehicle. The vehicle is deflected in the downward direction of the road surface inclination and a lateral force in the inclination direction of the road surface caused by the gravity acts, so that an actual yaw rate changes. This phenomenon is a natural phenomenon, and the behavior of the vehicle is not unstable. Although a lateral acceleration in the direction opposite to the lateral force is generated in the vehicle, the lateral force in the inclination direction of the road surface caused by the gravity also acts on an inertia weight of an acceleration sensor, so that a magnitude of a detected lateral acceleration does not become so large. As a result, a magnitude of a deviation between a normative yaw rate calculated using a vehicle lateral acceleration and an actual yaw rate does not become so large. On the other hand, a magnitude of a deviation between a normative yaw rate calculated without using a vehicle lateral acceleration and an actual yaw rate may become large, and it may be erroneously determined that behavior of the vehicle has become unstable.

Furthermore, when a vehicle receives crosswinds during traveling, the vehicle deflects downwind against an intention of a driver, so that a lateral acceleration and a yaw rate are generated in the vehicle due to the deflection. The lateral acceleration is reflected in a normative yaw rate calculated using a vehicle lateral acceleration, and an actual yaw rate changes due to deflection of the vehicle. Consequently, as will be described in detail later, a magnitude of a deviation between a normative yaw rate calculated using a vehicle lateral acceleration and an actual yaw rate and a magnitude of a deviation between a normative yaw rate calculated without using a vehicle lateral acceleration and an actual yaw rate are both increased. A magnitude of the former deviation is larger. Therefore, according to the former deviation, there is little fear that an erroneous determination is made that behavior of the vehicle is stable as compared with the latter deviation.

As is understood from the above, it is not always possible to make a determination accurately on the behavior of the vehicle by using both a deviation between a normative yaw rate calculated without using a vehicle lateral acceleration and an actual yaw rate and a deviation between a normative yaw rate calculated using a vehicle lateral acceleration and an actual yaw rate, In particular, in a vehicle in which a deflection control is performed, it is necessary to selectively use normative yaw rates used for vehicle behavior determination, depending on whether a deflection control is being performed or not.

The present disclosure provides a behavior control apparatus which is improved to determine behavior of a vehicle without erroneous determination in both cases where a deflection control is performed and where a deflection control is not performed in a vehicle in which a deflection control is performed by controlling braking/driving force difference between left and right wheels.

According to the present disclosure, a behavior control apparatus for a vehicle is provided which is applied to a vehicle in which a deflection control for changing a direction of travel of the vehicle is executed by controlling a difference in braking/driving force between right and left wheels without considering a yaw rate of the vehicle, and has a control unit that executes behavior control for stabilizing behavior of the vehicle by controlling a braking force of each wheel when it is determined that the behavior of the vehicle is unstable based on a yaw rate of the vehicle.

The control unit is configured to calculate a first normative yaw rate of the vehicle based on a vehicle speed, a steering angle and a lateral acceleration of the vehicle, to calculate a second normative yaw rate of the vehicle based on a vehicle speed and a steering angle, to determine, in a situation where the deflection control is not performed, that the behavior of the vehicle is unstable when an absolute value of a first yaw rate deviation which is a deviation between the first normative yaw rate and an actual yaw rate of the vehicle is larger than a first reference value, and, in a situation where the deflection control is performed, to calculate a second yaw rate deviation which is a deviation between the second normative yaw rate and an actual yaw rate of the vehicle and to determine that the behavior of the vehicle is unstable when at least an absolute value of the second yaw rate deviation is larger than a second reference value.

According to the above configuration, a first normative yaw rate of the vehicle is calculated based on a vehicle speed, a steering angle and a lateral acceleration of the vehicle, and a second normative yaw rate of the vehicle is calculated based on a vehicle speed and a steering angle. In a situation where a deflection control is not performed, it is determined that the behavior of the vehicle is unstable when an absolute value of a first yaw rate deviation which is a deviation between the first normative yaw rate and an actual yaw rate of the vehicle is larger than the first reference value. On the other hand, in a situation where a deflection control is performed, a second yaw rate deviation is calculated which is a deviation between the second normative yaw rate and an actual yaw rate of the vehicle and it is determined that the behavior of the vehicle is unstable when at least an absolute value of the second yaw rate deviation is larger than the second reference value.

As will be described in detail later, it is possible to prevent an erroneous determination caused by the behavior determination based on the second yaw rate deviation in a situation where a deflection control is not performed. Conversely, in a situation where a deflection control is performed, the behavior determination is performed based on at least the second yaw rate deviation, so that it is possible to prevent an erroneous determination due to the fact that only the behavior determination based on the first yaw rate deviation is performed.

In one aspect of the present disclosure, the control unit is configured to determine, in a situation where a deflection control is performed, that the behavior of the vehicle is unstable when an absolute value of the first yaw rate deviation is larger than the first reference value, an absolute value of the second yaw rate deviation is larger than the second reference value and signs of the first and second yaw rate deviations are the same.

According to the above aspect, in a situation where a deflection control is performed, the behavior determination is performed based on the first and second yaw rate deviations. Therefore, when a deflection control is being performed, the behavior determination of the vehicle can be more accurately performed as compared to where only the behavior determination based on the second yaw rate deviation is performed.

In another aspect of the present disclosure, the control unit is configured to calculate a third normative yaw rate based on a vehicle speed, a steering angle and an actual yaw rate of the vehicle, to determine, in a situation where the deflection control is not performed, that the behavior of the vehicle is unstable when an absolute value of the first yaw rate deviation is larger than the first reference value, an absolute value of a third yaw rate deviation which is a deviation between the third normative yaw rate and an actual yaw rate of the vehicle is larger than a third reference value and signs of the first and third yaw rate deviations are the same, and to determine, in a situation where the deflection control is performed, that the behavior of the vehicle is unstable when an absolute value of the first yaw rate deviation is larger than the first reference value, an absolute value of the second yaw rate deviation is larger than the second reference value, an absolute value of the third yaw rate deviation is larger than the third reference value and signs of the first to third yaw rate deviations are the same.

According to the above aspect, a third normative yaw rate of the vehicle is calculated based on a vehicle speed, a steering angle and an actual yaw rate of the vehicle. In a situation where a deflection control is not performed, it is determined that the behavior of the vehicle is unstable when an absolute value of the first yaw rate deviation is larger than the first reference value, an absolute value of a third yaw rate deviation which is a deviation between the third normative yaw rate and an actual yaw rate of the vehicle is larger than the third reference value and signs of the first and third yaw rate deviations are the same. On the other hand, in a situation where a deflection control is performed, it is determined that the behavior of the vehicle is unstable when an absolute value of the first yaw rate deviation is larger than the first reference value, an absolute value of the second yaw rate deviation is larger than the second reference value, an absolute value of the third yaw rate deviation is larger than the third reference value and signs of the first to third yaw rate deviations are the same.

Therefore, in both the situations where the deflection control is not performed and where the deflection control is performed, the behavior determination of the vehicle can be more accurately performed as compared to where the third yaw rate deviation is not used.

In another aspect of the present disclosure, the control unit is configured to calculate a first estimated yaw rate based on a wheel speed difference between the left and right wheels, to determine, in a situation where the deflection control is not performed, that the behavior of the vehicle is unstable when an absolute value of the first yaw rate deviation is larger than the first reference value, an absolute value of the third yaw rate deviation is larger than the third reference value, an absolute value of a forth yaw rate deviation which is a deviation between the first normative yaw rate and the first estimated yaw rate is larger than a fourth reference value and signs of the first, third and fourth yaw rate deviations are the same, and to determine, in a situation where the deflection control is performed, that the behavior of the vehicle is unstable when absolute values of the first to fourth yaw rate deviations are larger than the first to fourth reference values, respectively and signs of the first to fourth yaw rate deviations are the same.

According to the above aspect, a first estimated yaw rate is calculated based on a wheel speed difference between the left and right wheels. In a situation where a deflection control is not performed, it is determined that the behavior of the vehicle is unstable when an absolute value of the first yaw rate deviation is larger than the first reference value, an absolute value of the third yaw rate deviation is larger than the third reference value, an absolute value of a forth yaw rate deviation which is a deviation between the first normative yaw rate and the first estimated yaw rate is larger than the fourth reference value and signs of the first, third and fourth yaw rate deviations are the same. On the other hand, in a situation where a deflection control is performed, it is determined that the behavior of the vehicle is unstable when absolute values of the first to fourth yaw rate deviations are larger than the first to fourth reference values, respectively and signs of the first to fourth yaw rate deviations are the same.

Therefore, in both the situations where the deflection control is not performed and where the deflection control is performed, the behavior determination of the vehicle can be more accurately performed as compared to where a first estimated yaw rate is not calculated and a determination based on the fourth yaw rate deviation is not performed.

In another aspect of the present disclosure, the control unit is configured to calculate a second estimated yaw rate based on a vehicle speed and a lateral acceleration of the vehicle, to determine, in a situation where the deflection control is not performed, that the behavior of the vehicle is unstable when an absolute value of the first yaw rate deviation is larger than the first reference value, an absolute value of the third yaw rate deviation is larger than the third reference value, an absolute value of a fifth yaw rate deviation which is a deviation between the first normative yaw rate and the second estimated yaw rate is larger than a fifth reference value and signs of the first, third and fifth yaw rate deviations are the same, and to determine, in a situation where the deflection control is performed, that the behavior of the vehicle is unstable when absolute values of the first to third and fifth yaw rate deviations are larger than the first to third and fifth reference values, respectively and signs of the first to third and fifth yaw rate deviations are the same.

According to the above aspect, a second estimated yaw rate is calculated based on a vehicle speed and a lateral acceleration of the vehicle. In a situation where a deflection control is not performed, it is determined that the behavior of the vehicle is unstable when an absolute value of the first yaw rate deviation is larger than the first reference value, an absolute value of the third yaw rate deviation is larger than the third reference value, an absolute value of a fifth yaw rate deviation which is a deviation between the first normative yaw rate and the second estimated yaw rate is larger than the fifth reference value and signs of the first, third and fifth yaw rate deviations are the same. On the other hand, in a situation where a deflection control is performed, it is determined that the behavior of the vehicle is unstable when absolute values of the first to third and fifth yaw rate deviations are larger than the first to third and fifth reference values, respectively and signs of the first to third and fifth yaw rate deviations are the same.

Therefore, in both the situations where the deflection control is not performed and where the deflection control is performed, the behavior determination of the vehicle can be more accurately performed as compared to where a second estimated yaw rate is not calculated and a determination based on the fifth yaw rate deviation is not performed.

In another aspect of the present disclosure, the control unit is configured to calculate a second estimated yaw rate as a sum of a basic normative yaw rate calculated based on a vehicle speed and a steering angle and a correction amount of a normative yaw rate of the vehicle calculated based on at least one of a wheel speed difference between the left and right wheels and steering change amounts of front and rear wheels caused by the braking forces.

According to the above aspect, a second normative yaw rate is calculated as a value obtained by correcting a basic yaw rate of the vehicle based on a vehicle speed and a steering angle with a normative yaw rate correction amount of the vehicle that is based on at least one of a wheel speed difference between the right and left wheels and steering angle change amounts of the front and rear wheels caused by braking forces. Therefore, even when braking forces of the deflection control are high, the second normative yaw rate can be more accurately calculated and the behavior of the vehicle can be more accurately determined as compared to where the second normative yaw rate is the basic normative yaw rate of the vehicle based on a vehicle speed and a steering angle.

In another aspect of the present disclosure, the deflection control is a lane departure prevention control that imparts a braking force to one of the left and right wheels as necessary so that the vehicle does not departs from a lane.

According to the above aspect, in a vehicle in which the lane departure prevention control by a braking force is performed, the behavior determination of the vehicle can accurately be performed in both situations where the lane departure prevention control is performed and where the lane departure prevention control is not performed.

Other objects, other features and attendant advantages of the present disclosure will be readily understood from the description of the embodiments of the present disclosure described with reference to the following drawings.

DETAILED DESCRIPTION

Principle of the Present Disclosure Adopted in Embodiments

Prior to describing embodiments, the principle of the behavior control in the present disclosure will be described with reference to FIGS. 21 to 25 so as to facilitate understanding of the present disclosure.

<First Normative Yaw Rate YR1 and First Yaw Rate Deviation ΔYR1>

An overall gear ratio of a steering system of a vehicle is represented by n, a wheel base of the vehicle is represented by L and a stability factor of the vehicle is represented by Kh. Assuming that a yaw rate of the vehicle obtained using a vehicle speed V, a steering angle St and a lateral acceleration Gy of the vehicle is a first normative yaw rate YR1, which is expressed by the following equation (1). Therefore, a first yaw rate deviation ΔYR1, which is a difference between the first normative yaw rate YR1 and an actual yaw rate YR of the vehicle, is expressed by the following equation (2). The steering angle, the lateral acceleration of the vehicle, and the yaw rate of the vehicle are assumed to be positive when the vehicle turns to the left.

$$YR1 = \frac{VSt}{nL} - KhGyV \quad (1)$$

$$\Delta YR1 = YR1 - YR \quad (2)$$

<Second Normative Yaw Rate YR1 and Second Yaw Rate Deviation ΔYR1>

Assuming that a yaw rate of the vehicle obtained using a vehicle speed V and a steering angle St is a second normative yaw rate YR2, which is expressed by the following equation (3). Therefore, a second yaw rate deviation ΔYR2, which is a difference between the second normative yaw rate YR2 and an actual yaw rate YR of the vehicle, is expressed by the following equation (4).

$$YR2 = \frac{VSt}{nL} \cdot \frac{1}{1+KhV^2} \quad (3)$$

$$\Delta YR2 = YR2 - YR \quad (4)$$

<Characteristics of First and Second Yaw Rate Deviations>
<Bank Travel>

Figure 7:
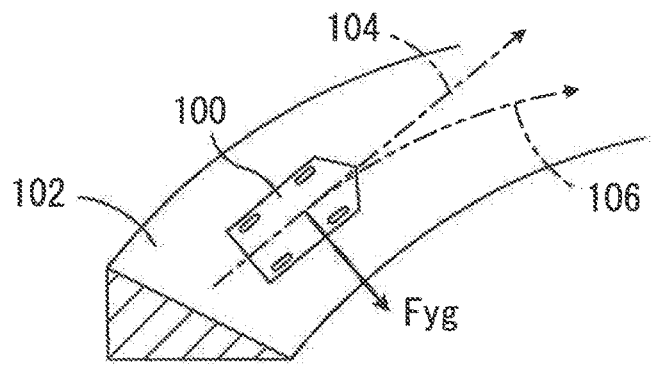
FIG. 7 is a view for explaining behavior of a vehicle when the vehicle travels on a bank road.

As shown in FIG. 7, when a vehicle 100 travels on a bank road 102 or a canted road which is inclined in the left or right direction (referred to as "bank traveling"), a lateral force Fyg in the inclination direction of the road surface caused by the gravity acts on the vehicle. The vehicle 100 is deflected to move in the downward direction of the road surface inclination as indicated by the two-dot chain line arrow 106 with respect to the original traveling direction (indicated by the one-dot chain line arrow 104) determined by a steering angle. This phenomenon is a natural phenomenon, and the behavior of the vehicle is not unstable.

Figure 8:
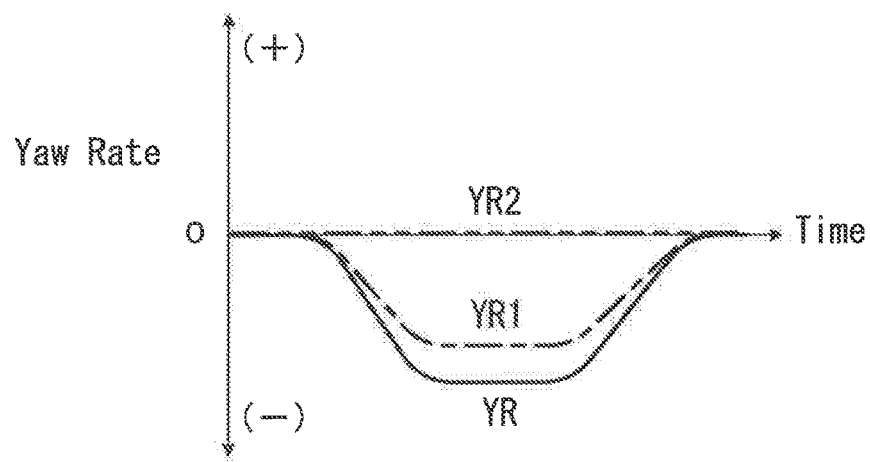
FIG. 8 is a view showing an example of changes in a actual yaw rate YR, a first normative yaw rate YR1 and a second normative yaw rate YR2 of the vehicle when the vehicle travels on a bank road.

A centripetal acceleration occurs due to the deflection of the vehicle, but the lateral force Fyg in the inclination direction of the road surface also acts on an inertia weight of a lateral acceleration sensor, and a lateral acceleration Gy detected by the lateral acceleration sensor becomes a positive value. Therefore, as shown in FIG. 8, the first normative yaw rate YR1 calculated in accordance with the above equation (1) changes in the same manner as the actual yaw rate YR. Consequently, a magnitude of the first yaw rate deviation ΔYR1 does not become a large value. On the other hand, since the second normative yaw rate YR2 does not include a lateral acceleration Gy of the vehicle as a parameter, if a vehicle speed V and a steering angle St are constant, it does not change as shown in FIG. 8. Therefore, a magnitude of the second yaw rate deviation ΔYR2 may become a large value. As a result, according to the first yaw rate deviation ΔYR1, it is not determined that the behavior of the vehicle is unstable, but according to the second yaw rate deviation ΔYR2, even though the behavior of the vehicle is not unstable, it may be determined that the behavior of the vehicle is unstable.

<Cross-Wind Travel>

Figure 9:
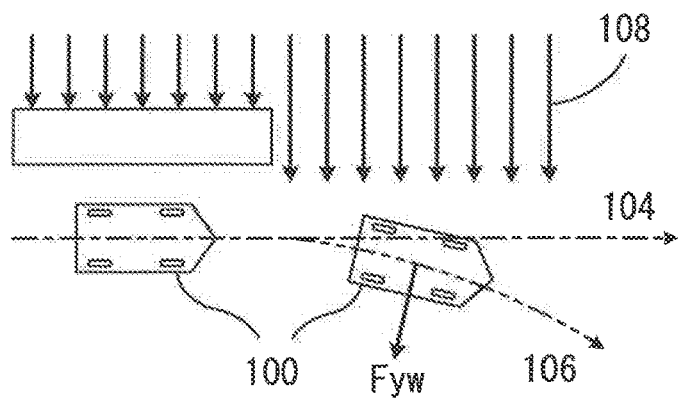
FIG. 9 is a view for explaining behavior of a vehicle when the vehicle receives crosswinds during traveling.

As shown in FIG. 9, when the vehicle 100 receives the crosswind 108 during traveling (referred to as "crosswind traveling"), a lateral force Fyw in the leeward direction caused by the crosswind acts on the vehicle. The vehicle is deflected in the leeward direction as indicated by the two-dot chain line arrow 106 with respect to the original traveling direction 104 determined by a steering angle. This phenomenon is an undesirable phenomenon which unnaturally changes the behavior of the vehicle, and it is necessary to determine that the behavior of the vehicle is unstable.

Figure 10:
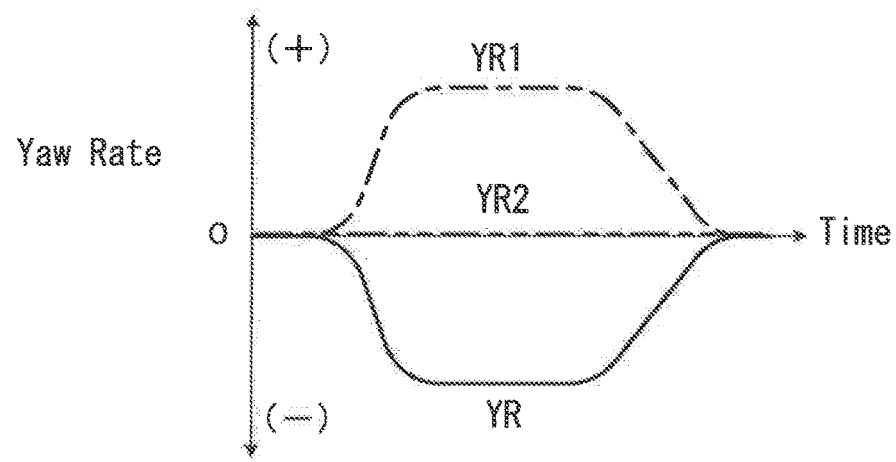
FIG. 10 is a view showing an example of changes in an actual yaw rate YR, a first normative yaw rate YR1, and a second normative yaw rate YR2 of the vehicle when the vehicle receives crosswinds during traveling.

In a situation where the vehicle is traveling in a crosswind condition, a centripetal acceleration is generated due to the deflection of the vehicle, but an inertial force to the outside of the turn due to the deflection of the vehicle acts on the inertia weight of the lateral acceleration sensor and an inertial force in the windward direction accompanying the lateral displacement of the vehicle acts so that a lateral acceleration Gy detected by the lateral acceleration sensor assumes a negative value having a relatively large absolute value. Therefore, as indicated by the one-dot chain line in FIG. 10, the first normative yaw rate YR1 changes with a value opposite in sign to an actual yaw rate YR. On the other hand, if a vehicle speed V and a steering angle St are constant, the second normative yaw rate YR2 does not change as indicated by the two-dot chain line in FIG. 10. Therefore, it is determined that the behavior of the vehicle is unstable also by the second yaw rate deviation ΔYR2, but according to the first yaw rate deviation ΔYR1, it is more early and effectively determined that the behavior of the vehicle is instable.

<Deflection Control>

Figure 11:
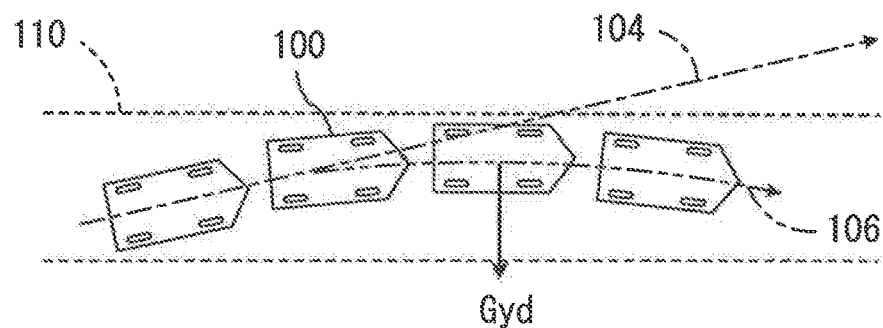
FIG. 11 is a view for explaining behavior of the vehicle when a deflection control by controlling braking forces of wheels is being performed.
Figure 12:
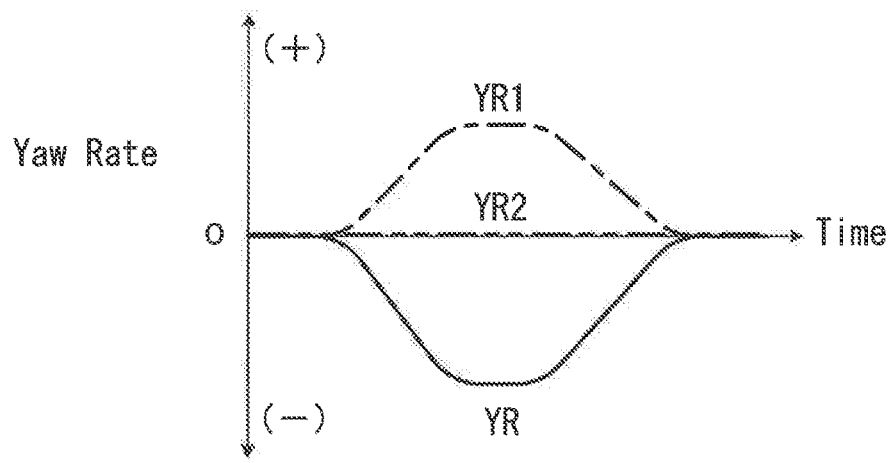
FIG. 12 is a view showing an example of changes in an actual yaw rate YR, a first normative yaw rate YR1, and a second normative yaw rate YR2 of the vehicle when a deflection control by controlling braking forces of wheels is being performed.

In a deflection control such as a lane departure prevention control by controlling braking forces of wheels, a direction of travel of the vehicle is changed so that the vehicle does not depart from a lane by controlling a difference in braking/driving force between right and left wheels without considering a yaw rate of the vehicle. That is, as shown in FIG. 11, when the vehicle 100 deviates from a lane 110 if it moves in the traveling direction 104 determined by a steering angle, the vehicle 100 is deflected back to the lane 110 as indicated by the two-dot chain line arrow 106. Therefore, as in the case where the vehicle travels in a crosswind condition, a first normative yaw rate YR1 assumes a value including a lateral acceleration Gyd resulting from the deflection, so that as shown in FIG. 12, it changes with a value opposite in sign to an actual yaw rate YR. On the other hand, a second normative yaw rate YR2 does not change as indicated by the two-dot chain line in FIG. 12 if a vehicle speed V and a steering angle St are constant. Therefore, although the behavior of the vehicle is not unstable, it is determined that the behavior of the vehicle is unstable by both the first yaw rate deviation ΔYR1 and the second normative yaw rate YR2, but according to the first yaw rate deviation ΔYR1, it is determined at an early stage that the behavior of the vehicle is unstable.

<Determination of Behavior of Vehicle when Deflection Control is not Performed>

Next, with respect to a situation where a deflection control is not performed, the reliability of the behavior determination of the vehicle performed using the first yaw rate deviation ΔYR1 and/or the second yaw rate deviation ΔYR2 will be explained with reference to Table 1. In Table 1, "U" indicates that the yaw rate deviation is used, and "N" indicates that the yaw rate deviation is not used. In the determination where either the first yaw rate deviation ΔYR1 or the second yaw rate deviation ΔYR2 is used, when an absolute value of each yaw rate deviation is larger than a corresponding reference values Re1 and Re2 (both are positive constants), it is determined that the behavior of the vehicle is unstable. This also applies to Table 2 described later.

| Determination | 1 | 2 | 3 |
|---|---|---|---|
| Reliability | Bad | Best | Bad |
| ΔYR1 | U | U | N |
| ΔYR2 | U | N | U |

In determination 1, both the first yaw rate deviation ΔYR1 and the second yaw rate deviation ΔYR2 are used. When absolute values of both the first yaw rate deviation ΔYR1 and the second yaw rate deviation ΔYR2 are larger than the reference values Re1 and Re2 (AND condition), respectively, it is determined that the behavior of the vehicle is unstable. In this determination, since a determination that the vehicle is in an understeer state is delayed in a situation where the vehicle is in an understeer state while traveling on a bank road, the reliability of the determination 1 is bad.

In determination 2, only the first yaw rate deviation ΔYR1 is used. When the deflection control is not performed, no change in a yaw rate caused by the deflection control occurs and a lateral acceleration Gyd of the vehicle due to the deflection control does not occur either. Since it is possible to determine whether or not the behavior of the vehicle is unstable using the first yaw rate deviation ΔYR1, the reliability of determination 2 is the best.

In determination 3, only the second yaw rate deviation ΔYR2 is used. In this determination, it may be determined that the vehicle is in an understeer state at an early stage during a bank traveling, and there is a possibility that the control of the braking forces by the behavior control unnecessarily starts. Accordingly, the reliability of the determination 3 is bad.

Although not shown in Table 1, it is conceivable to determine that the behavior of the vehicle is unstable when an absolute value of the first or second yaw rate deviation is larger than the corresponding reference value (OR condition). However, since this determination includes the above determination 3, the reliability of this determination is bad.
<Determination of Behavior of Vehicle when Deflection Control is Performed>

Next, with respect to a situation where the deflection control is performed, as shown in Table 2, the reliability of the behavior determination of the vehicle performed using the first yaw rate deviation ΔYR1 and/or the second yaw rate deviation ΔYR2 will be explained with reference to Table 2.

| Determination | 4 | 5 | 6 |
|---|---|---|---|
| Reliability | Best | Bad | Good |
| ΔYR1 | U | U | N |
| ΔYR2 | U | N | U |

In determination 4, as in the determination 1, both the first yaw rate deviation ΔYR1 and the second yaw rate deviation ΔYR2 are used. When absolute values of both the first yaw rate deviation ΔYR1 and the second yaw rate deviation ΔYR2 are larger than the reference values Re1 and Re2, respectively, it is determined that the behavior of the vehicle is unstable. In this determination, when the behavior of the vehicle is unstable, the behavior of the vehicle can be determined to be unstable without causing the problem of the determination 3, that is, the problem that the vehicle is determined to be in an understeer state at an early stage while traveling on a bank road. Therefore, the reliability of this determination is the best.

In determination 5, as in the determination 2, only the first yaw rate deviation ΔYR1 is used. As described above, when the deflection control is being performed, a lateral acceleration Gyd of the vehicle caused by the deflection control is reflected in the first yaw rate deviation ΔYR1, so that the reliability is low. Therefore, even though the behavior of the vehicle is unstable, it may be determined that the behavior of the vehicle is stable, or conversely, even though the behavior of the vehicle is stable, it may be determined that the behavior of the vehicle is unstable. Accordingly, the reliability of this determination is bad.

In determination 6, as in the determination 3, only the second yaw rate deviation ΔYR2 is used. As in the determination 3, it may be determined that the vehicle is in an understeer state early during bank traveling, and there is a possibility that the control of the braking forces by the behavior control unnecessarily starts. However, since the deflection control is performed, the influence of unnecessary behavior control on the vehicle is reduced by the deflection control. Therefore, the reliability of this determination is good.

Although not shown in Table 2, it is also conceivable to determine that the behavior of the vehicle is unstable when an absolute value of the first or second yaw rate deviation is larger than the corresponding reference value (OR condition). However, since this determination includes the above determination 5, the reliability of this determination is bad.

Based on the above discussion results, in the basic configuration of the behavior control apparatus of the present invention, in a situation where the deflection control is not being performed, when an absolute value of the first yaw rate deviation ΔYR1 exceeds the first reference value, it is determined that the behavior of the vehicle is unstable. On the other hand, in a situation where the deflection control is being performed, when an absolute value of the second yaw rate deviation ΔYR2 exceeds the second reference value, preferably the first and second yaw rate deviations ΔYR1 and ΔYR2 exceed the first and second reference values, respectively, it is determined that the behavior of the vehicle is unstable.

EMBODIMENTS

Next, some embodiments of the present disclosure will be described in detail.

First Embodiment

Figure 1:
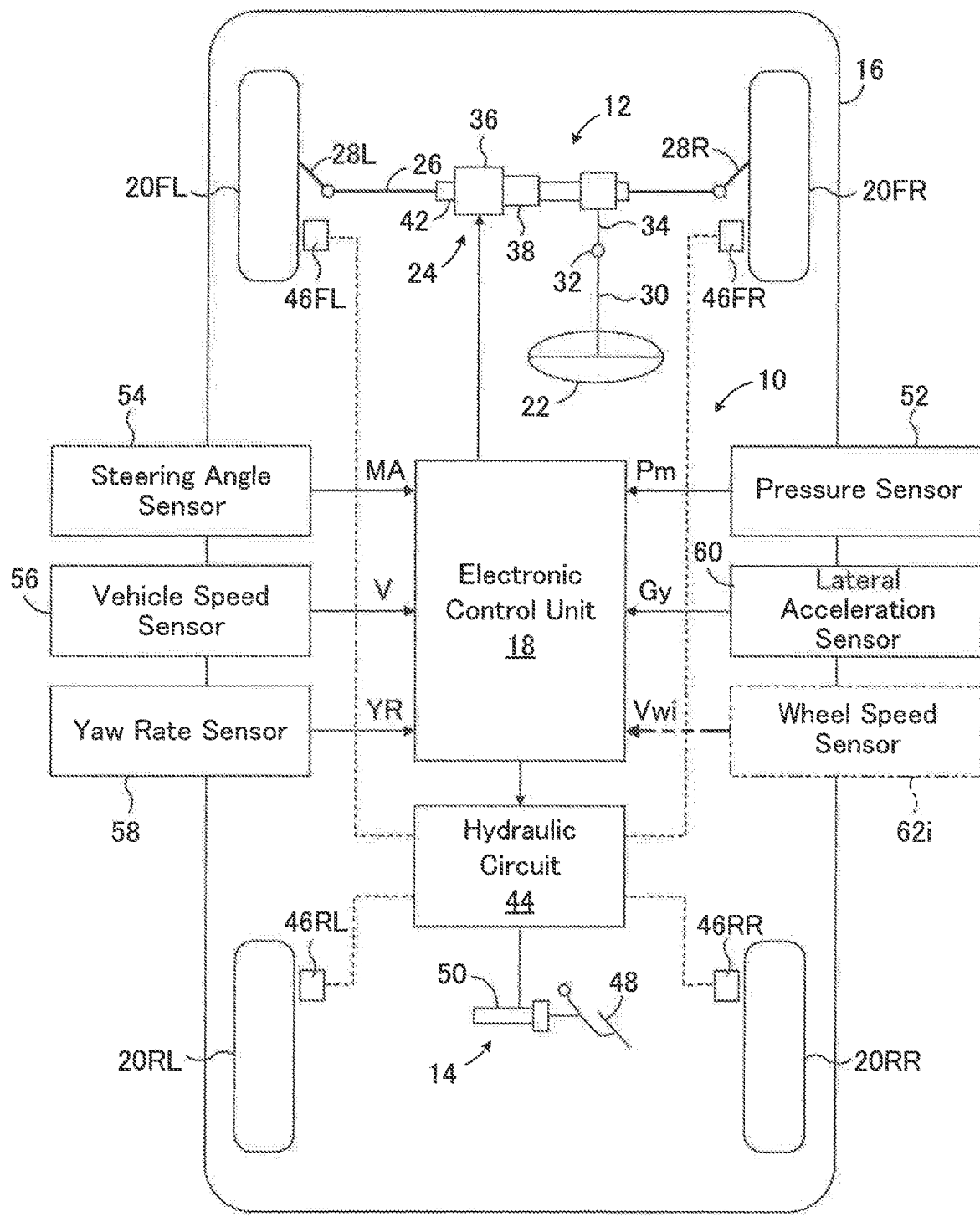
FIG. 1 is a schematic configuration diagram showing a first embodiment of a behavior control apparatus according to the present disclosure.

In FIG. 1, the behavior control apparatus 10 according to the embodiment is applied to a vehicle 16 having a steering device 12 and a braking device 14 and includes an electronic control unit 18 that performs behavior control for controlling behavior of the vehicle by controlling the braking device 14. The vehicle 16 has left and right front wheels 20FL and 20FR serving as steered wheels and left and right rear wheels 20RL and 20RR serving as non-steered wheels. The steering device 12 is configured to change a steered angle of the front wheels 20FL and 20FR in response to a driver's steering operation. Although not shown in FIG. 1, the front wheels 20FL and 20FR are supplied with driving force from an engine via a transmission. The vehicle to which the present disclosure is applied may be any one of a front wheel drive vehicle, a rear wheel drive vehicle and a four wheel drive vehicle.

The steering device 12 includes a rack-and-pinion type electric power steering device 24 which is driven in response to operation of a steering wheel 22 by the driver. A rack bar 26 of the electric power steering device 24 is connected to knuckle arms (not shown) of the front wheels 20FL and 20FR via tie rods 28L and 28R, respectively. The steering wheel 22 is connected to a pinion shaft 34 of the power steering device 24 via a steering shaft 30 and a universal joint 32.

In the illustrated embodiment, the electric power steering device 24 is a rack coaxial type electric power steering device, and includes a motor 36 and a conversion mechanism 38, e.g., a ball screw mechanism, configured to convert a rotational torque of the motor 36 into a force in a reciprocal direction of the rack bar 26. The electric power steering device 24 is controlled by an electric power steering device (EPS) control part of the electronic control unit 18. The electric power steering device 24 functions as a steering assist force generating device that reduces a driver's steering burden of the driver by generating auxiliary steering force that drives the rack bar 26 relative to the housing 42.

It is to be noted that the steering assist force generating device may have any configuration as long as it can generate auxiliary steering force and may be, for example, a column assist type electric power steering device. Further, although the steering input device steered by the driver is the steering wheel 22, the device may be a joystick type steering lever.

A braking force of each wheel is controlled by a hydraulic circuit 44 of the braking device 14 controlling the pressure in wheel cylinders 46FL, 46FR, 46RL and 46RR, that is, braking pressures. Although not shown in FIG. 1, the hydraulic circuit 44 includes an oil reservoir, an oil pump, various valve devices and the like. A master cylinder 50 is driven in response to a depression operation of a brake pedal 48 by the driver. A pressure sensor 52 that detects a master cylinder pressure Pm which is a pressure in the master cylinder is provided in the master cylinder. The braking pressure of each wheel cylinder is normally controlled on the basis of the master cylinder pressure Pm. Further, the braking pressure of each wheel cylinder is individually controlled by controlling the hydraulic circuit 44 by a braking force control part of the electronic control unit 18 as needed. Therefore, the braking device 14 can individually control the braking forces of the respective wheels, irrespective of the braking operation of the driver.

The electronic control unit 18 includes a behavior control part, and the behavior control part can control the braking device 14 via the braking force control part. Therefore, the behavior control part can control a deceleration of the vehicle 16 by controlling the braking forces of the left and right wheels, and also can control a yaw moment applied to the vehicle 16 by controlling a braking force difference between the left and right wheels to control a yaw rate YR of the vehicle. Accordingly, as will be described in detail later, the behavior control part functions as a control unit that performs behavior control for stabilizing the behavior of the vehicle 16 by controlling the braking forces of the wheels 20FL to 20RR.

Furthermore, the electronic control unit 18 includes a deflection control part, and the deflection control part can also control the braking device 14 via the braking force control part. The deflection control part determines whether or not there is a risk that the vehicle 16 will deviate from a lane in a manner known in the art based on image information ahead of the vehicle acquired by a CCD camera or the like not shown in FIG. 1. When it is determined that there is a possibility that the vehicle may deviate from the lane, the deflection control part applies a braking force to the left or right wheels of the front and rear wheels, thereby applying a yaw moment Myd for preventing the vehicle from deviating from the lane to the vehicle to perform the deflection control for deflecting the vehicle. In the deflection control part, the yaw rate of the vehicle is not considered. Further, as described later, when it is determined that the behavior of the vehicle is unstable, the application of the yaw moment Myd to the vehicle is executed in the behavior control.

As shown in FIG. 1, a steering angle sensor 54 that detects a steering angle St, that is, a rotation angle of the steering shaft 30 as a steering operation amount of the driver is provided. A signal indicating the steering angle St is input to the behavior control part and the EPS control part of the electronic control unit 18. A signal indicating a vehicle speed V detected by a vehicle speed sensor 56, a signal indicating a yaw rate YR of the vehicle detected by a yaw rate sensor 58, and a signal indicating as lateral acceleration Gy of the vehicle detected by a lateral acceleration sensor 60 are also input to the behavior control part of the electronic control unit 18.

The steering angle sensor 54 detects a steering angle St by setting the steering angle corresponding to the straight travel of the vehicle 16 to 0 and setting the steering angles in the left turning direction and the right turning direction to a positive value and a negative value, respectively. Similarly to the steering angle sensor 54, the yaw rate sensor 58 and the lateral acceleration sensor 60 detect a yaw rate YR and a lateral acceleration Gy by setting the yaw rate and the lateral acceleration corresponding to the straight travel of the vehicle 16 to 0 and setting the yaw rate and the lateral acceleration in the left turning direction and the right turning direction to positive and negative yaw rate YR and lateral acceleration Gy, respectively.

Each control part of the electronic control unit 18 may include a microcomputer having a CPU, a ROM, a RAM and an input/output port device and connected to each other by a bi-directional common bus. Each control part exchanges necessary signals with each other. A behavior control program of the vehicle is stored in the ROM, and the behavior control is executed by the CPU according to the control program.

Figure 2:
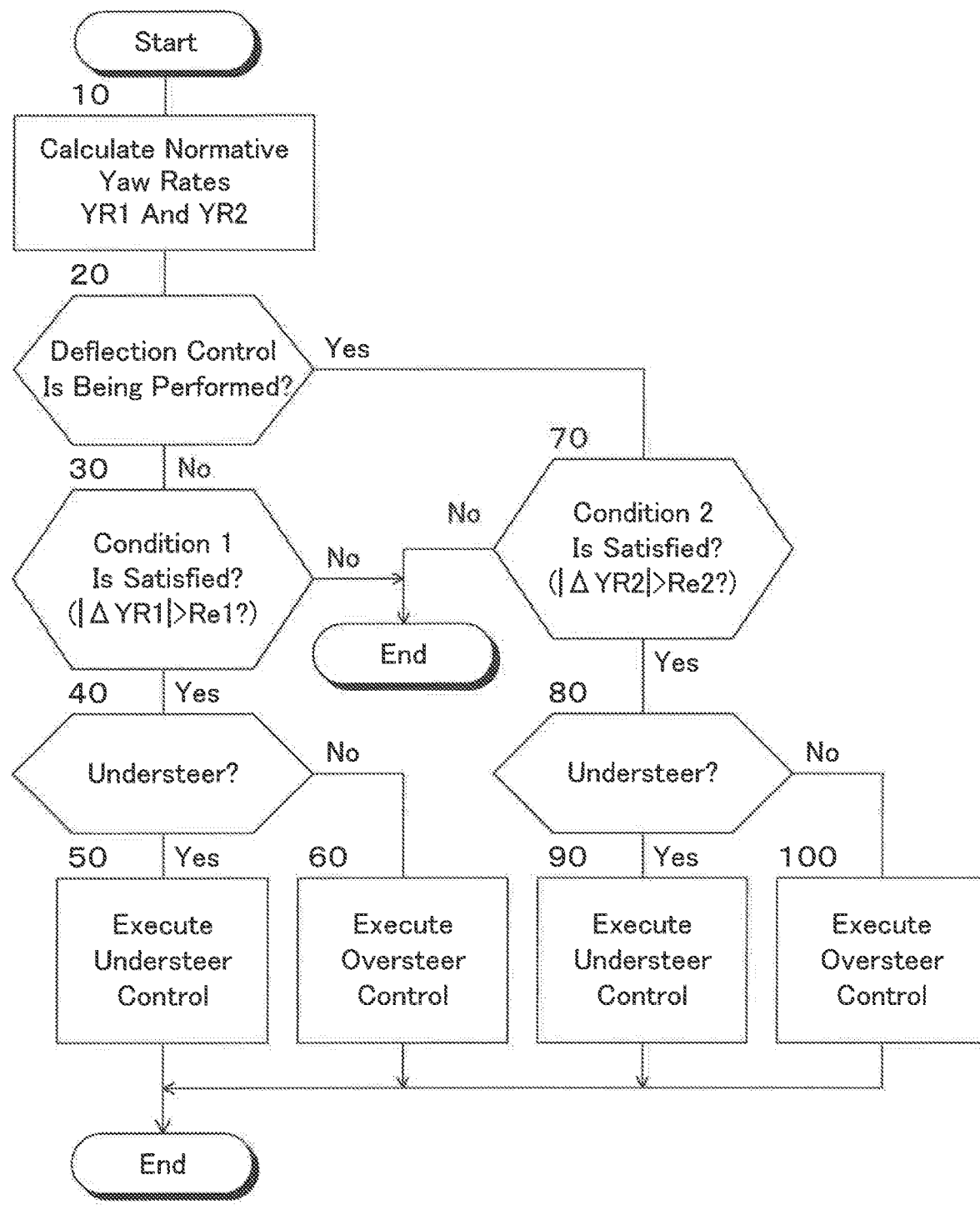
FIG. 2 is a flowchart showing a behavior control routine according to the first embodiment.

As will be described in detail later, in the first embodiment, the behavior control part of the electronic control unit 18 performs the behavior control according to the flowchart shown in FIG. 2. The behavior control part calculates a first normative yaw rate YR1 of the vehicle based on a vehicle speed V, a steering angle St, and a lateral acceleration Gy of the vehicle, and calculates a second normative yaw rate YR2 of the vehicle based on the steering angle St and the vehicle speed V. Furthermore, when the deflection control is not being performed, the behavior control part determines whether or not the behavior of the vehicle is unstable based on the first normative yaw rate YR1, and the behavior control part controls the braking forces for stabilizing the behavior of the vehicle when the behavior of the vehicle is unstable. On the other hand, when the deflection control is being performed, the behavior control part determines whether or not the behavior of the vehicle is unstable based on the second normative yaw rate YR2, and controls the braking forces for stabilizing the behavior of the vehicle when the behavior of the vehicle is unstable.

<Behavior Control Routine>

Next, the behavior control routine in the first embodiment will be described with reference to the flowchart shown in FIG. 2. The behavior control according to the flowchart shown in FIG. 2 is repeatedly executed at predetermined time intervals when an ignition switch (not shown) is ON.

First, in step 10, a first normative yaw rate YR1 and a second normative yaw rate YR2 are calculated according to the above equations (1) and (3), respectively. Notably, prior to step 10, a signal indicating a steering angle St and the like are read.

In step 20, it is determined whether or not the deflection control is being executed. When an affirmative determination is made, the behavior control proceeds to step 70, and when a negative determination is made, the behavior control proceeds to step 30.

In step 30, a first yaw rate deviation $\Delta YR1$ which is a deviation between the first normative yaw rate YR1 and an actual yaw rate YR of the vehicle is calculated according to the above equation (2). Further, a determination is made as to whether or not an absolute value of the first yaw rate deviation $\Delta YR1$ is larger than the reference value Re1, that is, whether or not a condition 1 of the behavior determination of the vehicle is satisfied. When a negative determination is made, the behavior control ends once, and when an affirmative determination is made, that is, when it is determined that the behavior of the vehicle is unstable, the behavior control proceeds to step 40.

In step 40, a drift state quantity DS of the vehicle indicating a degree of drift state of the vehicle is calculated using signYR as the sign of the actual yaw rate YR of the vehicle in accordance with the following equation (5). Further, by determining whether or not the drift state quantity DS is a positive value, it is determined whether or not the vehicle is in an understeer state. When a negative determination is made, the behavior control proceeds to step 60, and when a positive determination is made, the behavior control proceeds to step 50.

$$DS=signYR(YR1-YR) \qquad (5)$$

In step 50, a target yaw moment Mydt and a target deceleration Gxdt for reducing a degree of understeer of the vehicle are calculated from a map not shown in the figure set in advance based on the drift state quantity DS and a turning direction of the vehicle. Further, the braking force of each wheel is controlled in a manner known in the art so as to execute an understeer control so that the target yaw moment Mydt and the target deceleration Gxdt are achieved.

In step 60, a target yaw moment Mybt and a target deceleration Gxbt for reducing the degree of oversteer of the vehicle are calculated from a map not shown in the figure set in advance based on the drift state quantity DS and the turning direction of the vehicle. In addition, an oversteer control is performed by controlling the braking force of each wheel in a manner known in the art so that the target yaw moment Mybt and the target deceleration Gxbt are achieved.

In step 70, a second yaw rate deviation $\Delta YR2$ which is a deviation between the second normative yaw rate YR2 and an actual yaw rate YR of the vehicle is calculated according to the above-mentioned equation (4). Further, it is determined whether or not an absolute value of the second yaw rate deviation $\Delta YR2$ is larger than the reference value Re2, that is, whether or not a condition 2 of the behavior determination of the vehicle is satisfied. When a negative determination is made, the behavior control ends once, and when an affirmative determination is made, that is, it is determined that the behavior of the vehicle is unstable, the behavior control proceeds to step 80.

In step 80, a drift state quantity DS of the vehicle indicating a degree of a drift state of the vehicle is calculated according to the following equation (6). Further, similarly to step 40, by determining whether or not the drift state quantity DS is a positive value, it is determined whether or not the vehicle is in an understeer state. When a negative determination is made, the behavior control proceeds to step 100, and when an affirmative determination is made, the behavior control proceeds to step 90.

$$DS=signYR(YR2-YR) \qquad (6)$$

In step 90, as in step 50, a target yaw moment Mydt and a target deceleration Gxdt for reducing a degree of understeer of the vehicle are calculated from a map not shown in the figure set in advance based on the drift state quantity DS and a turning direction of the vehicle. A sum of the target yaw moment Mydt and the yaw moment Myd of the deflection control is calculated as a target yaw moment Myt. Further, an understeer control is performed by controlling the braking force of each wheel in a manner known in the art so that the target yaw moment Myt and the target deceleration Gxdt are achieved. Notably, when Myd is not zero, yaw moment control by the deflection control is also executed.

In step 100, as in step 60, a target yaw moment Mybt and a target deceleration Gxbt for reducing the degree of oversteer of the vehicle are calculated from a map not shown in the figure set in advance based on the drift state quantity DS and the turning direction of the vehicle. In this step also, a sum of the target yaw moment Mybt and the yaw moment Myd of the deflection control is calculated as a target yaw moment Myt. In addition, an oversteer control is performed by controlling the braking force of each wheel in a manner known in the art so that the target yaw moment Myt and the target deceleration Gxbt are achieved. Notably, when Myd is not zero, yaw moment control by the deflection control is also executed.

Operation of First Embodiment

As understood from the above description, regardless of whether or not the deflection control is being executed, in step 10, a first normative yaw rate YR1 and a second normative yaw rate YR2 are calculated. When the deflection control is not being executed, a negative determination is made in step 20 and steps 30 to 60 are executed. On the other hand, when the deflection control is being executed, steps 70 to 100 are executed.

<When the Deflection Control is not being Executed>

When it is determined in step 30 that an absolute value of the first yaw rate deviation $\Delta YR1$ is larger than the reference value Re1, in step 40, it is determined whether or not the vehicle is in an understeer state. When it is determined that the vehicle is in the understeer state, the understeer control is executed in step 50, and when it is determined that the vehicle is not in the understeer state, the oversteering control is executed in step 60.

Accordingly, the above-described determination 2 in which the reliability of determination is the best is performed, and the aforementioned determinations 1 and 3 in which the reliability of determination is bad is not performed. Therefore, since it is not determined whether or not an absolute value of the second yaw rate deviation $\Delta YR2$ is larger than the reference value Re2, even if the vehicle travels on a bank road, it is possible to prevent an early determination that the vehicle becomes in an understeer state from being made and unnecessary control of the braking forces by the behavior control from being started.

<When the Deflection Control is being Executed>

When it is determined in step 70 that an absolute value of the second yaw rate deviation ΔYR2 is larger than the reference value Re2, in step 80, it is determined whether or not the vehicle is in an understeer state. When it is determined that the vehicle is in the understeer state, the understeer control is executed in step 90, and when it is determined that the vehicle is not in the understeer state, the oversteer control is executed in step 100.

Accordingly, the above-described determination 6, in which the reliability of determination is good, is performed, and the above-described determination 5, in which the reliability of determination is bad, is not performed. That is, determination of the behavior of the vehicle is not performed only by determining whether or not an absolute value of the first yaw rate deviation ΔYR1 is larger than the reference value Re1. Therefore, it can be avoided that the behavior of the vehicle is determined to be stable despite the behavior of the vehicle being unstable. On the contrary, it can be avoided that the behavior of the vehicle is determined to be unstable despite the behavior of the vehicle being stable.

Second Embodiment

Figure 3:
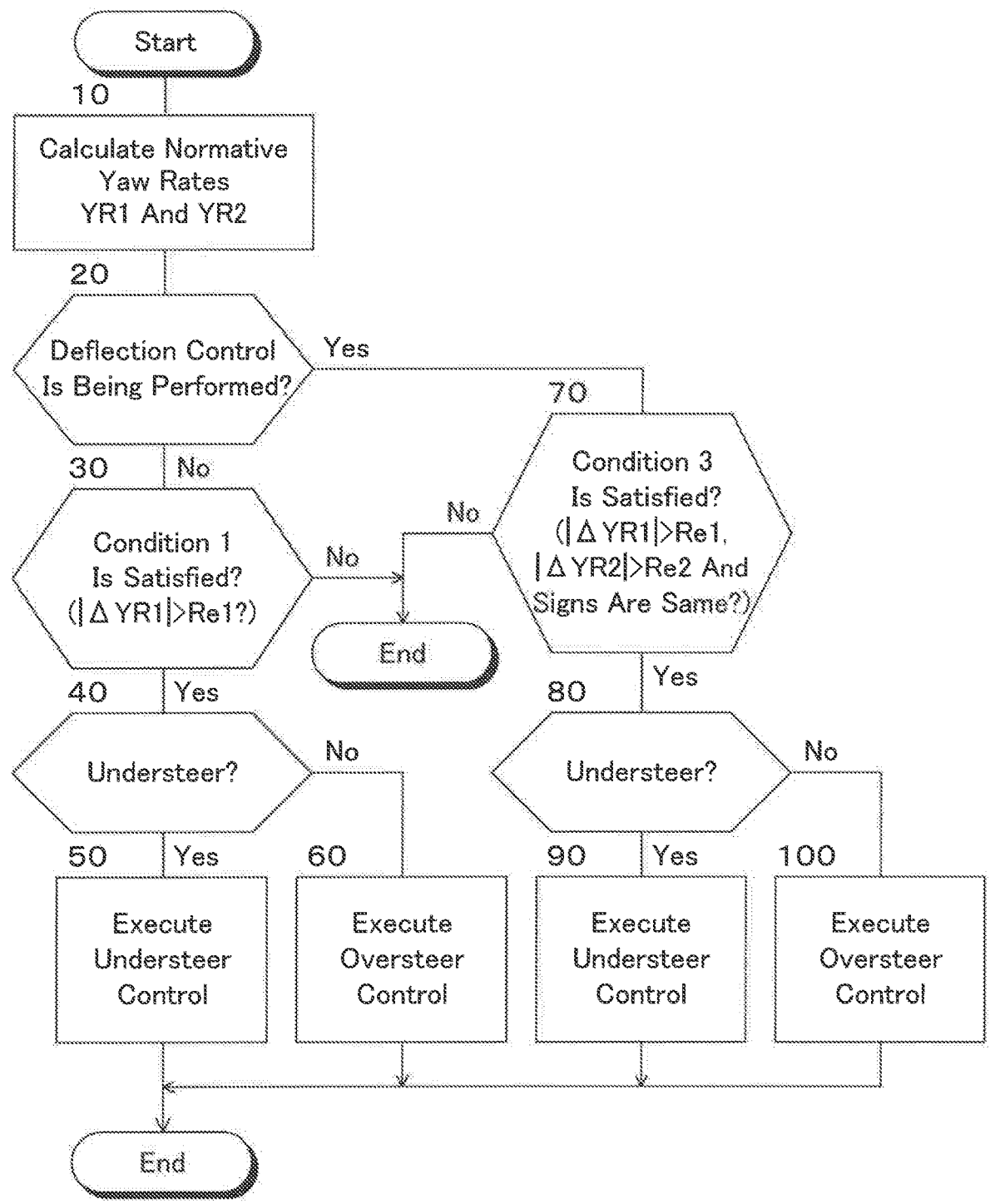
FIG. 3 is a flowchart showing a behavior control routine according to the second embodiment.

FIG. 3 is a flowchart showing the behavior control routine according to the second embodiment of the present disclosure. In FIG. 3, the same step numbers as those shown in FIG. 2 are assigned to the same steps as those shown in FIG. 2. This also applies to flowcharts of other embodiments to be described later.

In the second embodiment, steps other than step 70 are executed in the same manner as in the first embodiment. In step 70, it is determined whether or not an absolute value of the first yaw rate deviation ΔYR1 is larger than the reference value Re1, whether or not an absolute value of the second yaw rate deviation ΔYR2 is larger than the reference value Re2 and whether or not the signs of the first and second yaw rate deviations are the same, that is, it is determined whether or not a condition 3 of the behavior determination of the vehicle is satisfied.

Therefore, according to the second embodiment, when the deflection control is being executed, the above-described determination 4 in which the reliability of determination is the best is performed, and the above-described determination 5 is not performed. Accordingly, the behavior of the vehicle can be determined to be unstable when the behavior of the vehicle is unstable while preventing the vehicle from being determined to be in an understeer state early even if the vehicle travels on a bank road.

Notably, when the deflection control is not being executed, as in the first embodiment, it is determined whether or not an absolute value of the first yaw rate deviation ΔYR1 is larger than the reference value Re1. Therefore, even if the vehicle travels on a bank road, it can be avoided that it is determined that the vehicle is in an understeer state at an early stage and the control of the braking forces by the behavior control is unnecessarily started.

Third Embodiment

Figure 4:
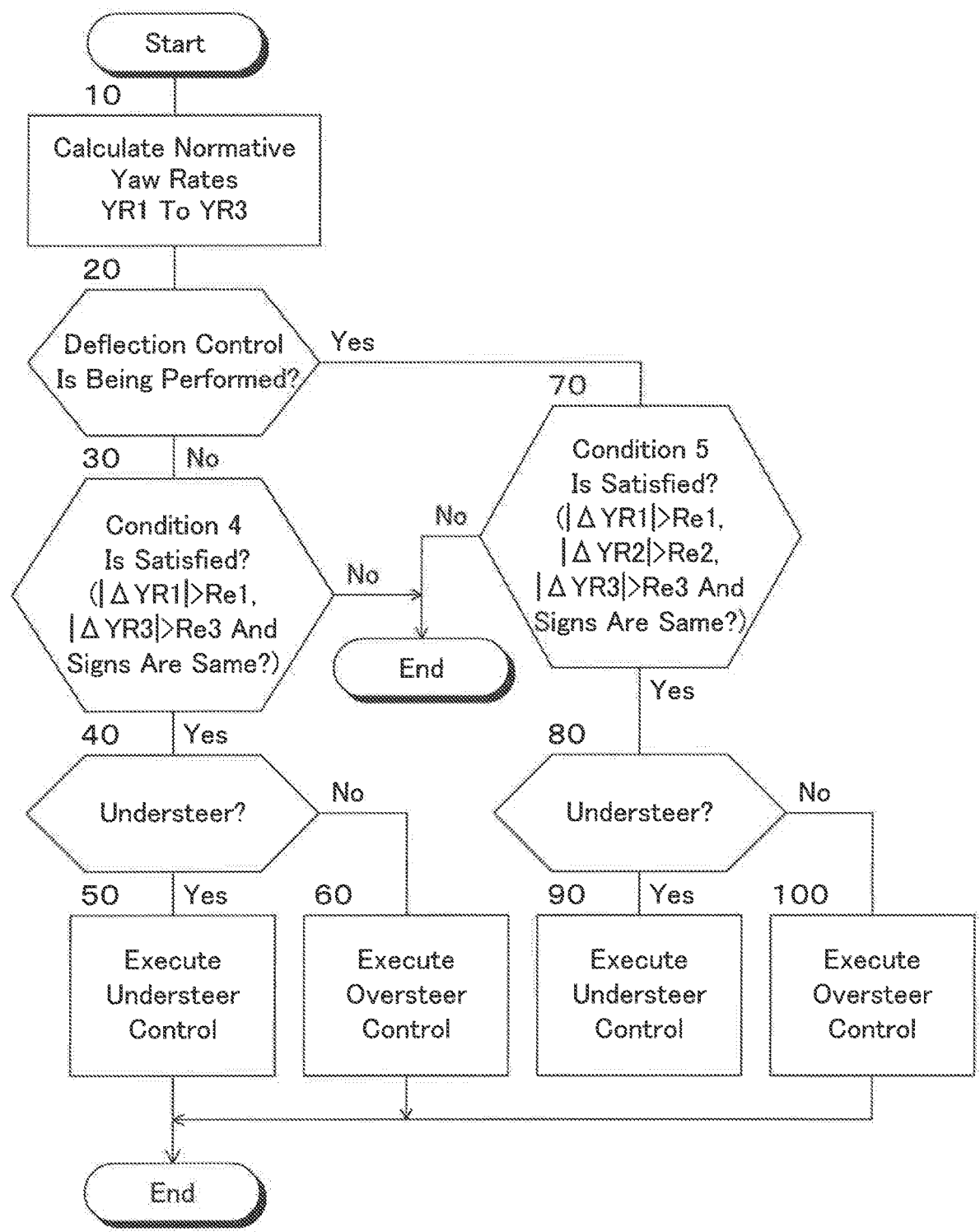
FIG. 4 is a flowchart showing a behavior control routine according to the third embodiment.

In the third embodiment, as shown in FIG. 4, steps other than steps 10, 30 and 70 are executed in the same manner as in the first embodiment.

In step 10, a first normative yaw rate YR1 and a second normative yaw rate YR2 are calculated, and a third normative yaw rate YR3 is calculated according to the following equation (7) corresponding to the above-mentioned equation (1). Notably, the equation (7) is obtained by modifying the equation (1) by utilizing that a lateral acceleration Gy of the vehicle is equal to a product YRV of a yaw rate YR and a vehicle speed V when the vehicle is in a steady turning state.

$$YR3 = \frac{VSt}{nL} - KhYRV^2 \qquad (7)$$

In step 30, a first yaw rate deviation ΔYR1 is calculated, and a third yaw rate deviation ΔYR3 (=YR3−YR) which is a deviation between the third normative yaw rate YR3 and an actual yaw rate YR of the vehicle is calculated. Further, it is determined whether or not an absolute value of the first yaw rate deviation ΔYR1 is larger than the reference value Re1, whether or not an absolute value of the third yaw rate deviation ΔYR3 is larger than a reference value Re3 (a positive constant) and whether or not the signs of the first and third yaw rate deviations are the same, that is, it is determined whether or not a condition 4 of the behavior determination of the vehicle is satisfied.

In step 70, a first yaw rate deviation ΔYR1 and a second yaw rate deviation ΔYR2 are calculated, and a third yaw rate deviation ΔYR3 is calculated in the same manner as in step 30. Further, it is determined whether or not an absolute value of the first yaw rate deviation ΔYR1 is larger than the reference value Re1, whether or not an absolute value of the second yaw rate deviation ΔYR2 is larger than the reference value Re2, whether or not an absolute value of the third yaw rate deviation ΔYR3 is larger than the reference value Re3 and whether or not the signs of the first to third yaw rate deviations are the same, that is, it is determined whether or not a condition 5 of the behavior determination of the vehicle is satisfied.

According to the third embodiment, in steps 30 and 70, determinations as to whether or not an absolute value of the third yaw rate deviation ΔYR3 is larger than the reference value Re3 are added to the determinations in steps 30 and 70 in the second embodiment, respectively. Therefore, in addition to obtaining the same operational effect as in the second embodiment described above, in both the situation where the deflection control is not executed and the situation where the deflection control is executed, the behavior determination of the vehicle can be performed more accurately than in the second embodiment.

Fourth Embodiment

In the fourth embodiment, as indicated by imaginary lines in FIG. 1, wheel speed sensors 62$i$ (i=fl, fr, rl and rr) for detecting wheel speeds Vwi (i=fl, fr, rl and rr) of the left and right front wheels 20FL and 20FR and the left and right rear wheels 20RL and 20RR are provided in the vehicle 16. Signal indicating wheel speeds Vwi are input from the wheel speed sensors 62$i$ to the behavior control part of the electronic control unit 18.

Figure 5:
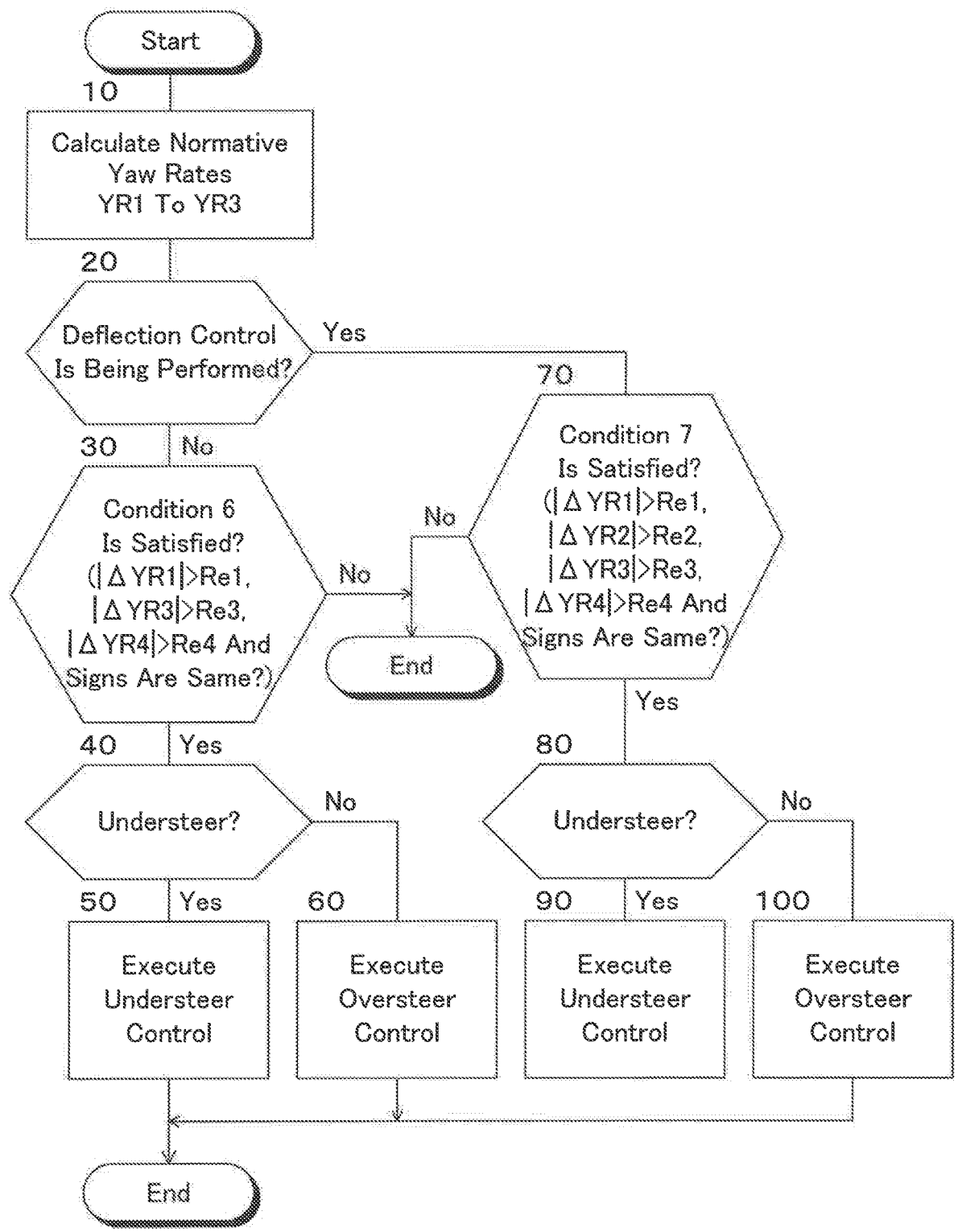
FIG. 5 is a flowchart showing a behavior control routine according to the fourth embodiment.

In the fourth embodiment, as shown in FIG. 5, the steps other than steps 30 and 70 are executed in the same manner as in the third embodiment.

In step 30, as in the third embodiment, first and third yaw rate deviations ΔYR1 and ΔYR3 are calculated, and a fourth yaw rate deviation ΔYR4 is calculated according to the following equation (8). Notably, the equation (8) is an equation based on the fact that when the vehicle is in the steady turning state, an actual yaw rate YR of the vehicle can be estimated from a value ΔVw/Tr (first estimated yaw rate YRe1) obtained by dividing a wheel speed difference ΔVw between the left and right wheels by a tread Tr of the vehicle. The wheel speed difference ΔVw may be a wheel speed difference Vwfr−Vwfl of the front wheels, a wheel speed difference Vwrr−Vwrl of the rear wheels or an average value of these wheel speed differences.

$$\Delta YR4 = \frac{VSt}{nL} - KhGyV - \frac{\Delta Vw}{Tr} \quad (8)$$

Further, in step 30, it is determined whether or not an absolute value of the first yaw rate deviation ΔYR1 is larger than the reference value Re1, whether or not an absolute value of the third yaw rate deviation ΔYR3 is larger than the reference value Re3, whether or not an absolute value of the fourth yaw rate deviation ΔYR4 is larger than a reference value Re4 (a positive constant) and whether or not the signs of the first, third and fourth yaw rate deviations are the same, that is, it is determined whether or not a condition 6 of the behavior determination of the vehicle is satisfied.

In step 70, as in the third embodiment, first to third yaw rate deviations ΔYR1 to ΔYR3 are calculated, and a fourth yaw rate deviation ΔYR4 is calculated in the same manner as in step 30.

Further, in step 70, it is determined whether or not absolute values of the first to fourth yaw rate deviations ΔYR1 to ΔYR4 are larger than the corresponding reference values Re1 to Re4 and whether or not the signs of the first to fourth yaw rate deviations are the same, that is, it is determined whether or not a condition 7 of the behavior determination of the vehicle is satisfied.

According to the fourth embodiment, in steps 30 and 70, determinations as to whether or not an absolute value of the fourth yaw rate deviation ΔYR4 is larger than the reference value Re4 are added to the determinations in steps 30 and 70 in the third embodiment, respectively. Therefore, in addition to obtaining the same operational effect as in the third embodiment described above, in both the situation where the deflection control is not executed and the situation where the deflection control is executed, the behavior determination of the vehicle can be performed more accurately than in the third embodiment.

Fifth Embodiment

Figure 6:
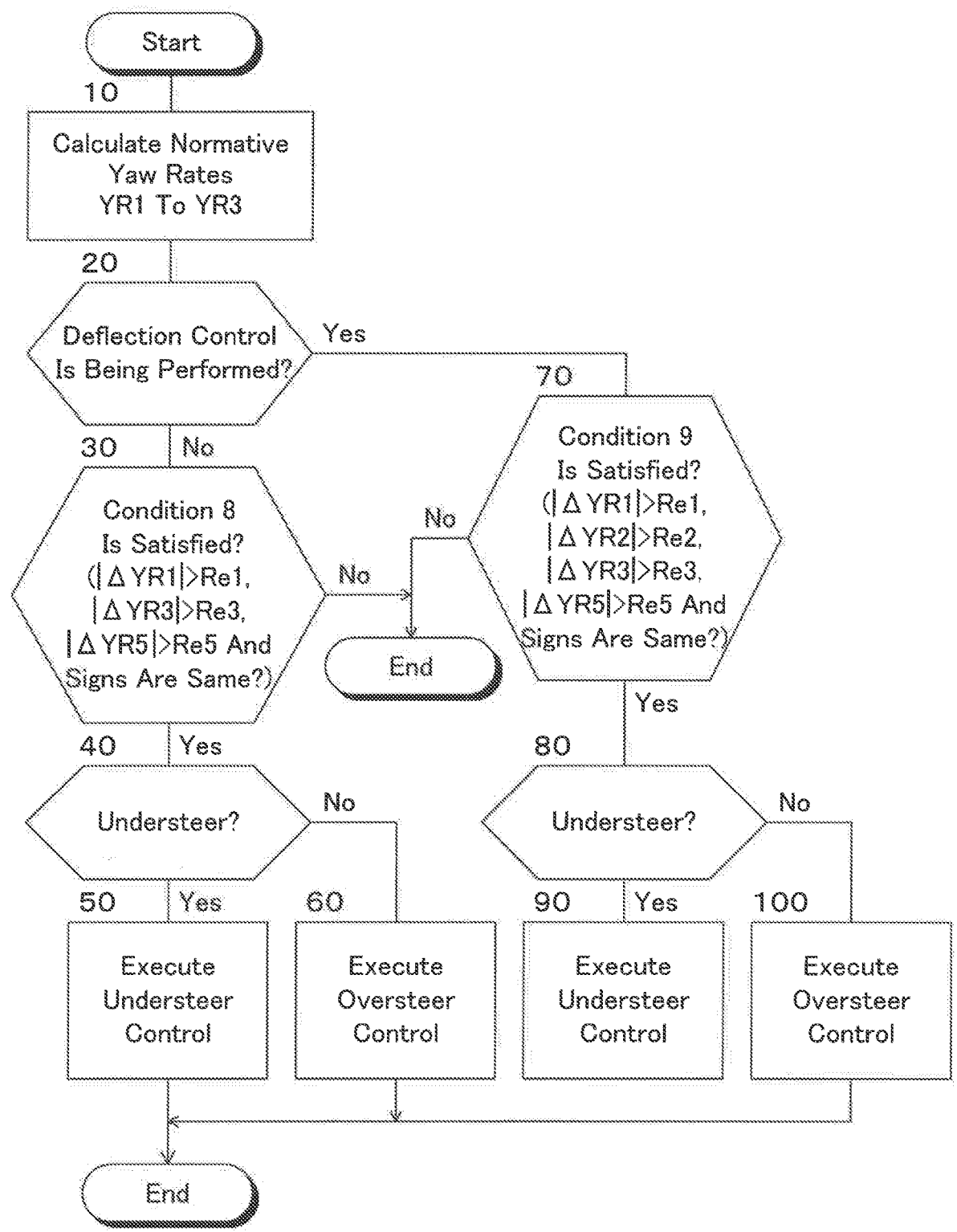
FIG. 6 is a flowchart showing a behavior control routine according to the fifth embodiment.

In the fifth embodiment, as shown in FIG. 6, steps other than steps 30 and 70 are executed in the same manner as in the third embodiment.

In step 30, as in the third embodiment, first and third normative yaw rate deviations ΔYR1 and ΔYR3 are calculated, and a fifth yaw rate deviation ΔYR5 is calculated according to the following equation (9). Notably, the equation (9) is an equation based on the fact that when the vehicle is in the steady turning state, an actual yaw rate YR of the vehicle can be estimated from a value GyN (a second estimated yaw rate YRe2) obtained by dividing a lateral acceleration Gy of the vehicle by a vehicle speed V.

$$\Delta YR5 = \frac{VSt}{nL} - KhGyV - \frac{Gy}{V} \quad (9)$$

Further, in step 30, it is determined whether or not an absolute value of the first yaw rate deviation ΔYR1 is larger than the reference value Re1, whether or not an absolute value of the third yaw rate deviation ΔYR3 is larger than the reference value Re3, whether or not an absolute value of the fifth yaw rate deviation ΔYR5 is larger than a reference value Re5 (a positive constant) and whether or not the signs of the first, third and fifth yaw rate deviations are the same, that is, it is determined whether or not a condition 8 of the behavior determination of the vehicle is satisfied.

In step 70, as in the third embodiment, first to third yaw rate deviations ΔYR1 to ΔYR3 are calculated, and a fifth yaw rate deviation ΔYR5 is calculated in the same manner as in step 30.

Further, in step 70, it is determined whether or not absolute values of the first to third yaw rate deviations ΔYR1 to ΔYR3 are larger than the corresponding reference values Re1 to Re3, whether or not an absolute value of the fifth yaw rate deviation ΔYR5 is larger than the corresponding reference value Re5 and whether or not the signs of the first to third and the fifth yaw rate deviations are the same, that is, it is determined whether or not a condition 9 of the behavior determination of the vehicle is satisfied.

According to the fifth embodiment, in steps 30 and 70, determinations as to whether or not an absolute value of the fifth yaw rate deviation ΔYR5 is larger than the reference value Re5 are added to the determinations in steps 30 and 70 in the third embodiment, respectively. Therefore, in addition to obtaining the same operational effect as in the third embodiment described above, in both the situation where the deflection control is not executed and the situation where the deflection control is executed, the behavior determination of the vehicle can be performed more accurately than in the third embodiment.

First to Fifth Modified Embodiment

In the deflection control, the braking forces Fxdf and Fxdr are applied to wheels on the left or right side of the front and rear wheels, respectively and a deflection yaw moment Md (=ΔFxTr/2) is given to the vehicle by a braking force difference ΔFx (=Fxdf+Fxdr) of the right and left wheels. Consequently, a yaw rate YRmd caused by the deflection yaw moment Md is generated in the vehicle, and the yaw rate YRmd is expressed by the following equation (10). In the following equation (10), Kf and Kr are equivalent cornering powers of the front and rear wheels, respectively.

$$YRmd = \frac{Kf + Kr}{2L^2 KfKr(1 + KhV^2)} \Delta Fx \frac{Tr}{2} \quad (10)$$

In the deflection control, the braking forces Fxdf and Fxdr are applied to wheels on the left or right side of the front and rear wheels, respectively so that when the braking forces are large, steer changes δdf and δxdr due to the braking forces are generated in the front and rear wheels. The steering change δdf is a change amount in a steered angle added to a steered angle of the front wheels dby steering operation and the steer change δxdr is a change amount in a steered angle added to the zero steered angle of the rear wheel. When steer changes df and δdr due to the braking forces are generated in the front and rear wheels, a yaw rate YRst caused by changes in the steered angles of the front and rear wheels is generated, and the yaw rate YRst is expressed by the following equation (11).

$$YRst = \frac{V}{2L}(\delta df - \delta dr)\frac{1}{1 + KhV^2} \qquad (11)$$

Therefore, in the first to fifth modified embodiments corresponding to the first to fifth embodiments, respectively, a second normative yaw rate YR2 is calculated in step 10 according to the following equation (12).

$$YR2 = \frac{VSt}{nL}\cdot\frac{1}{1+KhV^2} + \frac{Kf+Kr}{2L^2 KfKr(1+KhV^2)}\Delta Fx\frac{Tr}{2} + \frac{V}{2L}(\delta df - \delta dr)\frac{1}{1+KhV^2} \qquad (12)$$

According to the first to fifth modified embodiments, a second normative yaw rate YR2 is calculated such that a basic normative yaw rate calculated according to the above-mentioned equation (3) is corrected by yaw rates YRmd and YRst generated by the deflection control. Therefore, even when the braking forces applied to the wheels by the deflection control are high, a second normative yaw rate YR2 can be more accurately calculated as compared to the first to fifth embodiments. Consequently, as compared to the first to fifth embodiments, the behavior of the vehicle can more accurately be determined.

In addition, according to the first to fifth modified embodiments, a basic normative yaw rate is corrected by both a yaw rate YRmd caused by a yaw moment Md of the deflection of the vehicle and a yaw rate YRst caused by changes in the steered angles of the front and rear wheels. Therefore, as compared to where a correction is made only by one of the yaw rates YRmd and YRst, it is possible to accurately calculate a second normative yaw rate YR2 and accurately determine the behavior of the vehicle.

Although the present disclosure has been described in detail with reference to specific embodiments and modified embodiments, it will be apparent to those skilled in the art that the present disclosure is not limited to the above-described embodiments and modified embodiments, and various other embodiments are possible within the scope of the present disclosure.

For example, in the above-described embodiments, although the deflection control is the lane departure prevention control, as long as the vehicle is deflected by controlling a difference of braking force and/or driving force between the left and right wheels without considering a yaw rate of a vehicle, it may be any deflection control known in the part, such as emergency avoidance control for preventing collision of a vehicle.

In the above-described embodiments, by applying the braking forces to wheels on the left or right side of the front and rear wheels, a yaw moment Myd is given to the vehicle, and the vehicle is deflected. However, braking forces may be applied to both of the left and right wheels so as to decelerate the vehicle in addition to the application of a yaw moment Myd, and a yaw moment Myd may be given to the vehicle due to a difference in braking forces between the left and right wheels. Furthermore, when applying a yaw moment Myd, a braking force may be applied to one of the left and right wheels, and a driving force of the other of the left and right wheels may be increased.

In the above-described embodiments, when it is determined that the behavior of the vehicle is unstable in a situation where the deflection control is executed, a sum of s target yaw moment Mybt of the behavior control of the vehicle and a yaw moment Myd of the deflection control is calculated as a target yaw moment Myt. However, a target yaw moment Myt may be set to a larger one of a target yaw moment Mybt of the behavior control and a yaw moment Myd of the deflection control.

In the above-described modified embodiments, the second normative yaw rate YR2 is calculated by correcting a value calculated according to the above-mentioned equation (3) by a yaw rate YRmd caused by a yaw moment Md of the deflection of the vehicle generated by the deflection control and a yaw rate YRst caused by changes in steered angles of the front and rear wheels. However, the correction may be performed by only one of a yaw rate YRmd and a yaw rate YRst, and in that case also, the second normative yaw rate YR2 can be more accurately calculated as compared to where no correction is performed.

Further, in the above-described modified embodiments, the second normative yaw rate YR2 is corrected by a yaw rate YRmd and a yaw rate YRst. However, at least one of the first yaw rate YR1 and the third to fifth yaw rates YR3 to YR5 may also be corrected by a yaw rate YRmd and/or a yaw rate YRst.

What is claimed is:

1. A behavior control apparatus for a vehicle which is applied to a vehicle in which a deflection control for changing a direction of travel of the vehicle is executed by controlling a difference in braking/driving force between right and left wheels without considering a yaw rate of the vehicle, and has a control unit that executes behavior control for stabilizing behavior of the vehicle by controlling a braking force of each wheel when it is determined that the behavior of the vehicle is unstable based on a yaw rate of the vehicle, wherein the control unit is configured to calculate a first normative yaw rate of the vehicle based on a vehicle speed, a steering angle and a lateral acceleration of the vehicle, to calculate a second normative yaw rate of the vehicle based on a vehicle speed and a steering angle, to determine, in a situation where the deflection control is not performed, that the behavior of the vehicle is unstable when an absolute value of a first yaw rate deviation which is a deviation between the first normative yaw rate and an actual yaw rate of the vehicle is larger than a first reference value, and, in a situation where the deflection control is performed, to calculate a second yaw rate deviation which is a deviation between the second normative yaw rate and an actual yaw rate of the vehicle and to determine that the behavior of the vehicle is unstable when at least an absolute value of the second yaw rate deviation is larger than a second reference value.

2. The behavior control apparatus for a vehicle according to claim 1, wherein the control unit is configured to determine, in a situation where a deflection control is performed, that the behavior of the vehicle is unstable when an absolute value of the first yaw rate deviation is larger than the first reference value, an absolute value of the second yaw rate deviation is larger than the second reference value and signs of the first and second yaw rate deviations are the same.

3. The behavior control apparatus for a vehicle according to claim 1, wherein the control unit is configured to calculate a third normative yaw rate based on a vehicle speed, a steering angle and an actual yaw rate of the vehicle, to determine, in a situation where the deflection control is not performed, that the behavior of the vehicle is unstable when an absolute value of the first yaw rate deviation is larger than the first reference value, an absolute value of a third yaw rate deviation which is a deviation between the third normative yaw rate and an actual yaw rate of the vehicle is larger than a third reference value and signs of the first and third yaw rate deviations are the same, and to determine, in a situation where the deflection control is performed, that the behavior of the vehicle is unstable when an absolute value of the first yaw rate deviation is larger than the first reference value, an absolute value of the second yaw rate deviation is larger than the second reference value, an absolute value of the third yaw rate deviation is larger than the third reference value and signs of the first to third yaw rate deviations are the same.

4. The behavior control apparatus for a vehicle according to claim 1, wherein the control unit is configured to calculate a first estimated yaw rate based on a wheel speed difference between the left and right wheels, to determine, in a situation where the deflection control is not performed, that the behavior of the vehicle is unstable when an absolute value of the first yaw rate deviation is larger than the first reference value, an absolute value of the third yaw rate deviation is larger than the third reference value, an absolute value of a forth yaw rate deviation which is a deviation between the first normative yaw rate and the first estimated yaw rate is larger than a fourth reference value and signs of the first, third and fourth yaw rate deviations are the same, and to determine, in a situation where the deflection control is performed, that the behavior of the vehicle is unstable when absolute values of the first to fourth yaw rate deviations are larger than the first to fourth reference values, respectively and signs of the first to fourth yaw rate deviations are the same.

5. The behavior control apparatus for a vehicle according to claim 1, wherein the control unit is configured to calculate a second estimated yaw rate based on a vehicle speed and a lateral acceleration of the vehicle, to determine, in a situation where the deflection control is not performed, that the behavior of the vehicle is unstable when an absolute value of the first yaw rate deviation is larger than the first reference value, an absolute value of the third yaw rate deviation is larger than the third reference value, an absolute value of a fifth yaw rate deviation which is a deviation between the first normative yaw rate and the second estimated yaw rate is larger than a fifth reference value and signs of the first, third and fifth yaw rate deviations are the same, and to determine, in a situation where the deflection control is performed, that the behavior of the vehicle is unstable when absolute values of the first to third and fifth yaw rate deviations are larger than the first to third and fifth reference values, respectively and signs of the first to third and fifth yaw rate deviations are the same.

6. The behavior control apparatus for a vehicle according to claim 1, wherein the control unit is configured to calculate a second estimated yaw rate as a sum of a basic normative yaw rate calculated based on a vehicle speed and a steering angle and a correction amount of a normative yaw rate of the vehicle calculated based on at least one of a wheel speed difference between the left and right wheels and steering change amounts of front and rear wheels caused by the braking forces.

7. The behavior control apparatus for a vehicle according to claim 1, wherein the deflection control is a lane departure prevention control that imparts a braking force to one of the left and right wheels as necessary so that the vehicle does not departs from a lane.

* * * * *